United States Patent [19]

McCandless et al.

[11] Patent Number: 5,079,921
[45] Date of Patent: Jan. 14, 1992

[54] EXHAUST BACK PRESSURE CONTROL SYSTEM

[75] Inventors: James C. McCandless, Rolling Meadows; Milan E. Zlock, Greensboro; Terry G. Wood, Countryside; Dale A. Oehlerking, Des Plaines; Titus J. Iwaszkiewicz, Woodridge, all of Ill.

[73] Assignee: Navistar International Transporation Corp., Chicago, Ill.

[21] Appl. No.: 535,924

[22] Filed: Jun. 11, 1990

[51] Int. Cl.$^5$ .................. F02B 37/00; F02D 9/06
[52] U.S. Cl. .................. 60/602; 123/323
[58] Field of Search .......... 123/323; 60/600, 601, 60/602, 603

[56] References Cited

U.S. PATENT DOCUMENTS

| | | |
|---|---|---|
| 3,096,614 | 7/1963 | Silver et al. |
| 3,234,924 | 2/1966 | May |
| 3,523,418 | 8/1970 | Marsee ................ 60/292 |
| 3,591,959 | 7/1971 | Kubis |
| 3,941,035 | 3/1976 | Mueller ................ 92/49 |
| 4,005,578 | 2/1977 | McInerney ............ 60/602 |
| 4,005,579 | 2/1977 | Lloyd .................. 60/602 |
| 4,062,332 | 12/1977 | Perr ................... 123/323 |
| 4,075,990 | 2/1978 | Ribeton |
| 4,157,744 | 6/1979 | Capriotti ............. 184/6.3 |
| 4,220,008 | 9/1980 | Wilber et al. ........ 60/602 |
| 4,335,849 | 6/1982 | van Bashuysen ....... 237/12.3 B |
| 4,387,572 | 6/1983 | Richardson et al. ... 60/602 |
| 4,389,984 | 6/1983 | Destrampe ............ 123/196 S |
| 4,707,987 | 11/1987 | Atkin ................. 60/324 |
| 4,787,044 | 11/1988 | Nagata et al. ........ 123/323 |
| 4,835,963 | 6/1989 | Hardy ................. 123/323 |
| 4,905,200 | 2/1990 | Pidsosny et al. ...... 364/300 |

FOREIGN PATENT DOCUMENTS 158364 9/1984 Japan ................... 123/323

Primary Examiner—Michael Koczo
Attorney, Agent, or Firm—Dennis K. Sullivan

[57] ABSTRACT

An exhaust back pressure control system includes a valve in the exhaust outlet of a turbocharger of an internal combustion engine which is controlled by an engine control microcomputer. When the valve is moved toward a closed position, it restricts the exhaust flow, thereby increasing back pressure and friction within the engine by producing an artificial load thereon, and thus speeds up the warming process taking place within the engine upon starting thereof. The valve is moved by an actuating piston within a hydraulic cylinder using engine oil pressure controlled by an electrically operated valve receiving a pulse width modulated operating signal from the engine microcomputer, the operating signal being generated to provide a desired back pressure as a function of engine coolant temperature, engine speed, engine fuel comsumption, and actual back pressure. Operation of the system is enabled if the ambient air temperature is below 2° C. and also for the period that the elapsed time since start of engine is less than thirty seconds, the latter enablement being provided to exercise the system during extended periods of warm weather operation when the system would otherwise be inactive.

45 Claims, 3 Drawing Sheets

EXHAUST BACK PRESSURE CONTROL SYSTEM

BACKGROUND OF THE INVENTION

The present invention relates to an exhaust back pressure control system for an internal combustion engine, particularly a diesel engine, to improve engine warmup upon starting in a cold environment. The control system incorporates a valve assembly mounted at the turbine discharge outlet of a turbocharger, the position of which is controlled by a microcomputer through an electrically controlled hydraulic valve using engine lubricating oil pressure to provide a controlled increase of exhaust back pressure on the engine during cold start conditions, thereby decreasing the warm-up period for the engine.

Due to the increased efficiency and lower combustion chamber surface-to-volume ratio, direct injection diesel engines are inherently slower to warm up than indirect injection engines. The increase in back pressure provides an artificial load to the engine which creates a greater friction therein, causing a quicker engine warm-up and improved heating of the cab of the vehicle.

PRIOR ART

Various back pressure valve controls and sensing means have been proposed for use in vehicle engines. For example, the Atkin U.S. Pat. No. 4,707,987 discloses an exhaust system for an internal combustion spark ignition engine which includes a valve which can be moved by a vacuum actuator from a fully open inoperative position to an operative position in which it restricts the exhaust passageway by a variable amount. In the operative position, a coil spring urges the valve to close the exhaust passageway against the pressure of exhaust gases, thereby increasing the back pressure on the engine in a controlled way. This is done on start-up to reduce the warm-up time of the engine and to reduce hydrocarbon emissions. When the engine has warmed up, the actuator moves the valve to its inoperative position in response to a sensed engine temperature or after a predetermined length of time after the engine has been started.

It is further known to control a waste gate valve of a turbocharger through a system using lubricating oil as the motive fluid to control the valve position, as shown in, for example, in U.S. Pat. Nos. 4,005,578, 4,005,579, and 4,387,572.

SUMMARY OF THE INVENTION

It is a primary object of the present invention to provide an exhaust back pressure control system for a turbocharged internal combustion engine to increase the back pressure during starting and thereby improve the warmup characteristics of the engine during cold starting.

It is a further object of the invention to provide exhaust back pressure control which is responsive to various engine parameters, such as coolant temperature, ambient temperature, engine speed, engine load, and time since start, to provide quick warm-up consistent with minimum degradation of engine performance and fuel economy.

Yet a further object of the invention is to provide an exhaust back pressure control system which prevents or limits system operation under certain engine operating conditions, such as full speed or full load, or when the coolant temperature is in the normal operating range.

These objects and others as may become apparent hereinafter are specifically met in an exhaust back pressure control system for a diesel internal combustion engine including a valve at the discharge end of the turbine housing of the turbocharger, an engine oil powered hydraulic actuator controlling the position of the valve, the oil pressure in the actuator being controlled by an oil control valve responsive to a pulse width modulated signal, an ambient temperature sensor, such as a temperature gauge or other type of thermostat control device, mounted within the engine air induction system for monitoring the temperature of engine intake air, a coolant temperature sensor, a back pressure sensor mounted within the exhaust manifold of the engine to provide a feedback circuit, and operational software within an electronic engine controller connected to the sensors which, depending on the engine speed and fuel rate, sends a pulse width modulated control signal to the oil control valve to modify the position of the valve to provide the desired back pressure for the engine speed and load. A timer is also provided within the system to generate a short operational period of the system upon each starting of the engine regardless of the ambient conditions in order to exercise the system during extended periods of non-use thereof, such as during summer operation, and thus maintain the system in operating condition.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
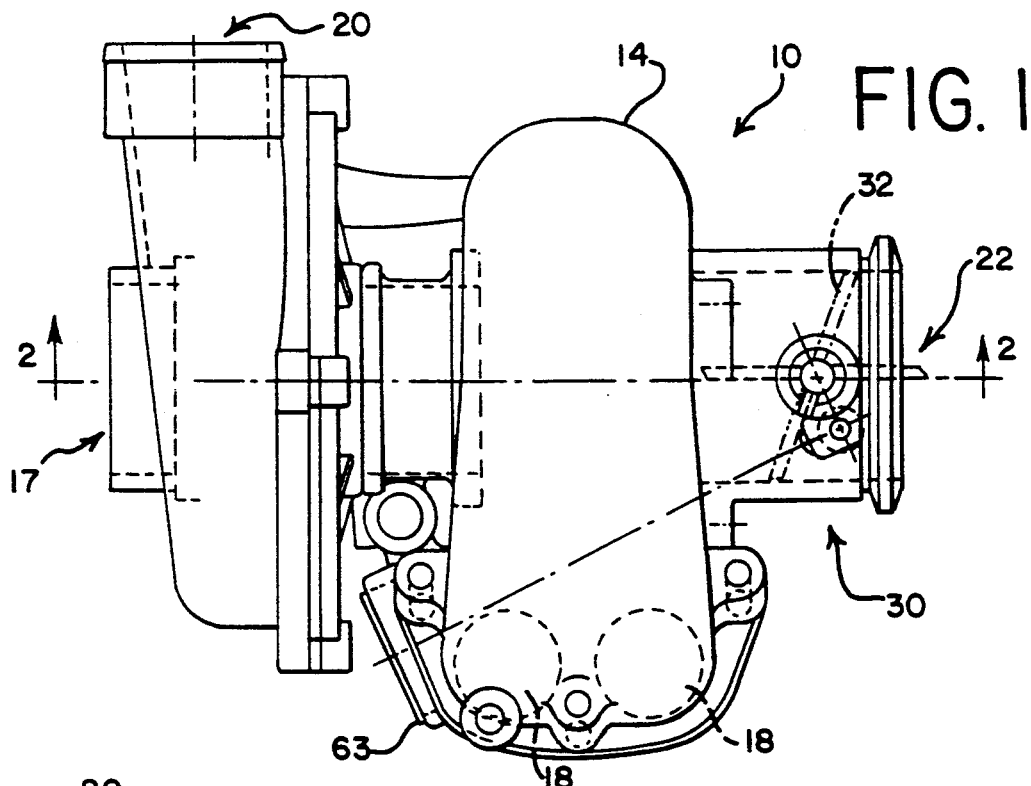
FIG. 1 is a plan view of a turbocharger incorporating the structure of the exhaust back pressure control system of the present invention.
Figure 2:
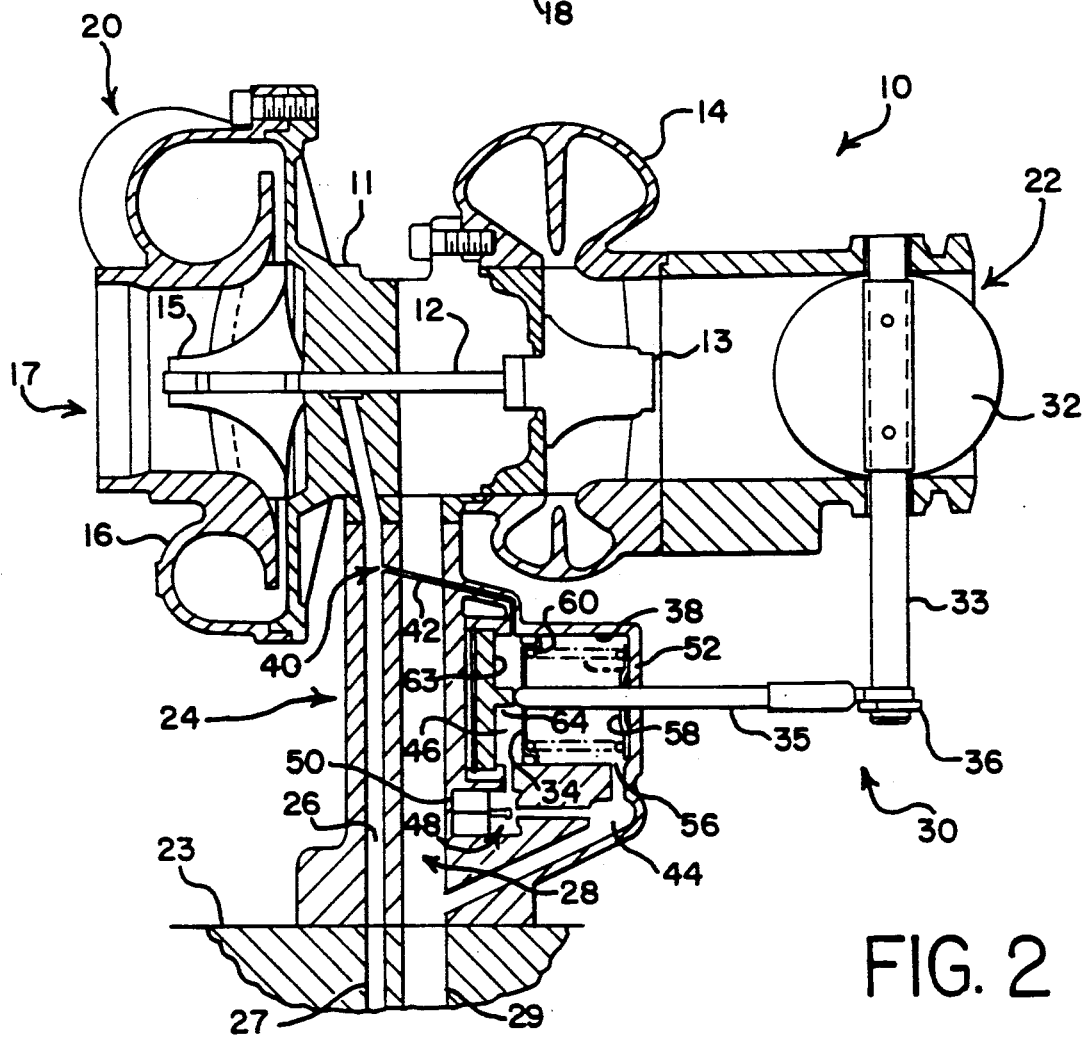
FIG. 2 is a partly schematic sectional view of the turbocharger of FIG. 1, taken along the line 2—2 thereof, incorporating the exhaust back pressure control system, and additionally illustrating the mounting of the turbocharger on a portion of an engine.

Referring now to the drawings, there is illustrated in FIGS. 1 and 2 a turbocharger 10 incorporating components of the exhaust back pressure control system 30 of the present invention. The turbocharger 10 includes a bearing housing 11 within which a shaft 12 is rotatably mounted, the shaft having a turbine end 13 disposed within a turbine housing 14 and a compressor end 15 disposed within a compressor housing 16. The turbocharger 10 includes an air inlet 17, two turbine inlet ports 18, a compressor discharge port 20 and a turbine discharge port 22. The turbocharger 10 is mounted to an engine crankcase 23 by a pedestal 24 thereof.

The turbocharger 10 includes within its pedestal 24 a lubricating oil feed passage 26 connected between a pressurized oil gallery 27 of the engine crankcase 23 and the shaft 12 in the bearing housing 11 as well as an oil drain passage 28 which drains oil from the bearing housing 11 through passage 29 in the engine crankcase 23 to maintain the turbocharger 10 lubricated. It will be appreciated that the foregoing is a generic description of a typical turbocharger commonly used on diesel engines.

In accordance with the invention, a butterfly valve 32 is mounted for pivotal movement within the turbine discharge port 22 by means of pivot shaft 33. The butterfly valve 32 should withstand temperatures ranging up to 1250° F. When the butterfly valve 32 is in an open, non-blocking position in port 22, its presence is almost transparent to the engine. On the other hand, when the butterfly valve 32 is placed in a closed, or partially closed, position blocking discharge port 22, the back pressure in the exhaust system of the engine can be substantially increased. The position of the butterfly valve 32 is controlled by a hydraulic actuator piston 34 attached to a piston rod 35 pivotally connected to the shaft 33 through a lever 36 to generate the pivotal movement of the valve 32 in response to the motion of the hydraulic actuator piston 34.

The actuator piston 34 is located within an actuator cylinder 38 which receives a continuous flow of pressurized oil from the engine oil gallery 27 through a small bleed orifice 40 in the turbocharger lubricating oil feed passage 26. The bleed orifice 40 supplies an oil line 42 leading into the head end of actuator cylinder 38. An end cap 63 disposed in the head end of the cylinder 38 is provided with an axial projection 64 disposed to engage the end of the rod 35, which passes through the piston 34, to prevent the piston from closing the passage 42 into the cylinder. An oil drain line 44 is provided for the rod end actuator cylinder 38 to prevent oil leaking past the seals on the piston 34 from filling the spring cavity, the drain line 44 feeding into the oil drain passage 28 of the turbocharger 10.

Figure 3:
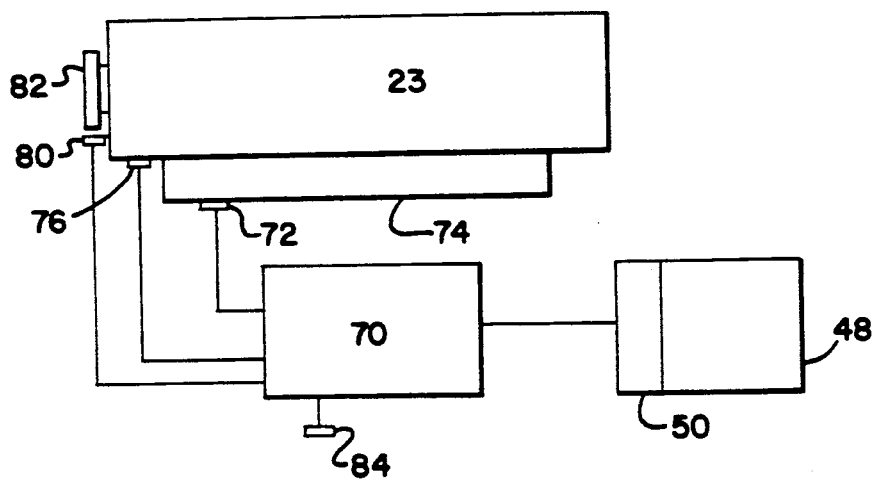
FIG. 3 is a block diagram of the exhaust back pressure control system of FIG. 1 including sensors and microcomputer.

To control the oil pressure acting on the head of the piston 34 within the actuator cylinder 38 to control the butterfly valve 32, a solenoid operated oil flow control valve 48 is provided for controlled drainage from the head end 46 of the cylinder 38 through passage 49 into the drain passage 44 and to thereby regulate the position of piston 34 in the cylinder. When the flow control valve 48 is moved to close drain passage 49, pressure increases within the actuator cylinder 38 causing the piston 34 to be moved to close the valve 32 against the opposing or biasing force of a coil return spring 52 disposed about the piston rod 35 within the cylinder 38. The return spring has one end 56 engaging a retainer 58 within the cylinder 38 and the other end 60 engaging the rod end side of the piston 34. As shown in the schematic FIG. 3, the oil flow control valve 48 is operated by a solenoid 50 energized in accordance with a pulse width modulated signal produced by an electronic engine controller or microcomputer 70 (FIG. 3). The microcomputer 70 is a programmable electronic engine control unit, of the type described, for example, in U.S. Pat. No. 4,905,200, which naturally has several additional engine control functions beyond that described herein. Among these functions is producing a fuel delivery output signal 78 to the fuel injection system indicative of the quantity of fuel to be delivered to the cylinders of the engine for the desired engine output under the existing ambient and load conditions. This fuel delivery output signal is also utilized in the control of the exhaust back pressure valve 32. The microcomputer 70 is also responsive to input signals from an exhaust back pressure sensor 72 mounted in the exhaust manifold 74 of the engine 23, a coolant temperature sensor 76 mounted within the coolant jacket of the engine 23, an engine speed sensor 80 mounted to pickup the speed of the engine crankshaft 82, and an ambient temperature sensor 84 which may be disposed in the engine air inlet 17, in the manner defined by the operating software to be discussed below.

As stated above, a problem encountered in cold weather operation with the direct injection engine is that during startup the engine has low heat rejection, that is, a relatively small amount of heat is transferred to the engine coolant resulting in very little heat being provided in the coolant flowing to the vehicle heater. To reduce this problem, the exhaust back pressure system under computer control operates to increase the parasitic or friction load on the engine, and thus the fuel consumption, during startup periods, thereby increasing the heat rejection from the engine to the coolant and to the vehicle heater, resulting in a quicker warm-up of the passenger compartment.

The method followed by the system to achieve this includes the steps of monitoring various engine parameters, such as fuel consumption, engine speed, coolant temperature, exhaust back pressure, ambient conditions, and heat demand required, and relating these in the microcomputer 70 to provide a system output in the form of a pulse width modulated signal to the solenoid-controlled oil flow control valve 48, thereby generating precise control of the oil pressure within the actuator cylinder 38 and the position of the piston 34 therewithin to determine the position of the butterfly valve 32 in the turbine discharge port 22.

Several criteria have been established so that the system 30 does not unduly overload the engine during periods of running under high load or at high speeds and to produce system response. In this respect, a maximum time for closing valve 32 of 30 seconds and a maximum time for opening valve 32 of 1 second are desirable. Also, regulation of the system 30 should take place below the thermostat opening temperature for the engine and the valve 32 is to remain open at all times under wide open throttle conditions. A desirable value for back pressure when the engine is running at low idle, at a 600 rpm minimum, at −23° C., is 200 kPa. Continuous modulation of the back pressure, dependent on the speed at which the engine is functioning and the load placed upon the engine, is highly desirable.

Figure 4:
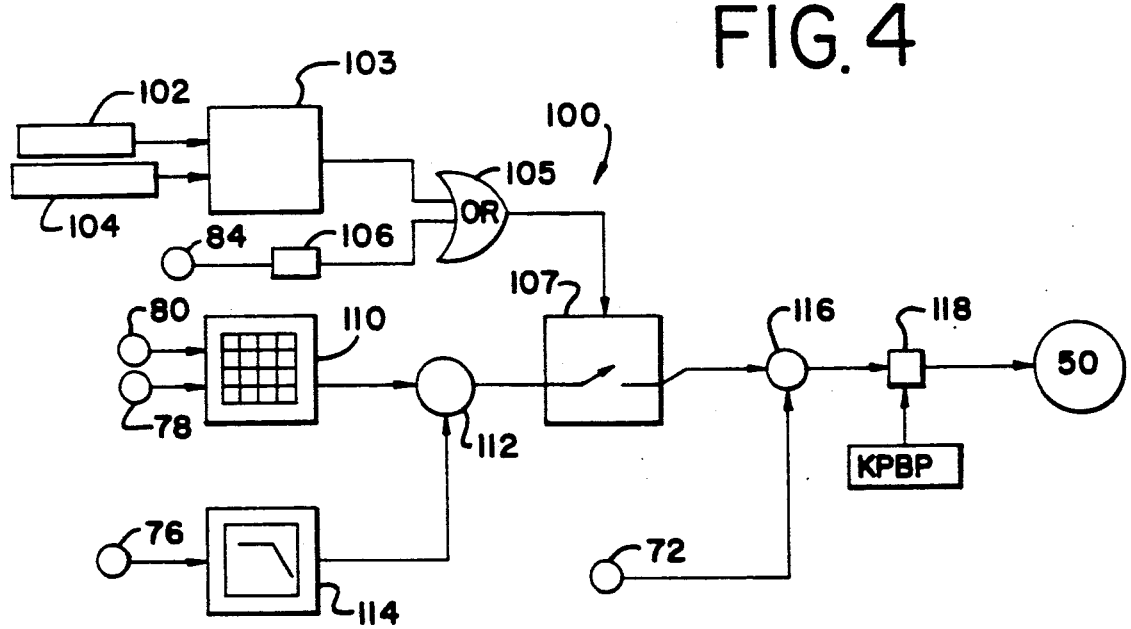
FIG. 4 is a control logic flow diagram setting forth the operation of the system of FIG. 1.

In FIG. 4, the operating strategy to satisfy these criteria and operate the system 30 is set forth in the form of a logic diagram 100 for operating the microcomputer 70. It will be appreciated that various inputs in diagram 100 may represent values already present in the microcomputer 70 as a result of its control of other engine functions. As illustrated, a timer 102 for the system 30 is provided which measures elapsed time since the start of the engine, more specifically, the time since the engine reaches low idle speed, and provides an input to comparator 103 along with a preset short startup enable period input 104, preferably equal to thirty seconds. As long as the timer input 102 is less than the preset enable period 104, an enable signal is sent from comparator 103 to OR gate 105. When the time elapsed on the timer 102 becomes greater than the two second enable period 104, no enable signal is sent and the butterfly valve 32 of the exhaust back pressure system 30 is disabled to open the turbine discharge port 22 unless the enable signal is present from another source as will be discussed shortly. The enable period should be sufficiently long to exercise the system, i.e., to permit some movement of the valve 32, while being of sufficiently limited duration to prevent control of the exhaust back pressure from significantly affecting engine operation.

Concurrently, an ambient temperature switch 106, which is connected to ambient temperature sensor 84, is set to send an enable signal to the OR gate 105 at ambient temperatures of less than 2° C. maintaining the system 30 enabled for a longer period of time. Thus, if an enable signal is received by the OR gate from either the short duration comparator 103 or the long duration switch 106, an enable signal will be sent from the OR gate 105 to close switch 107.

Figure 5:
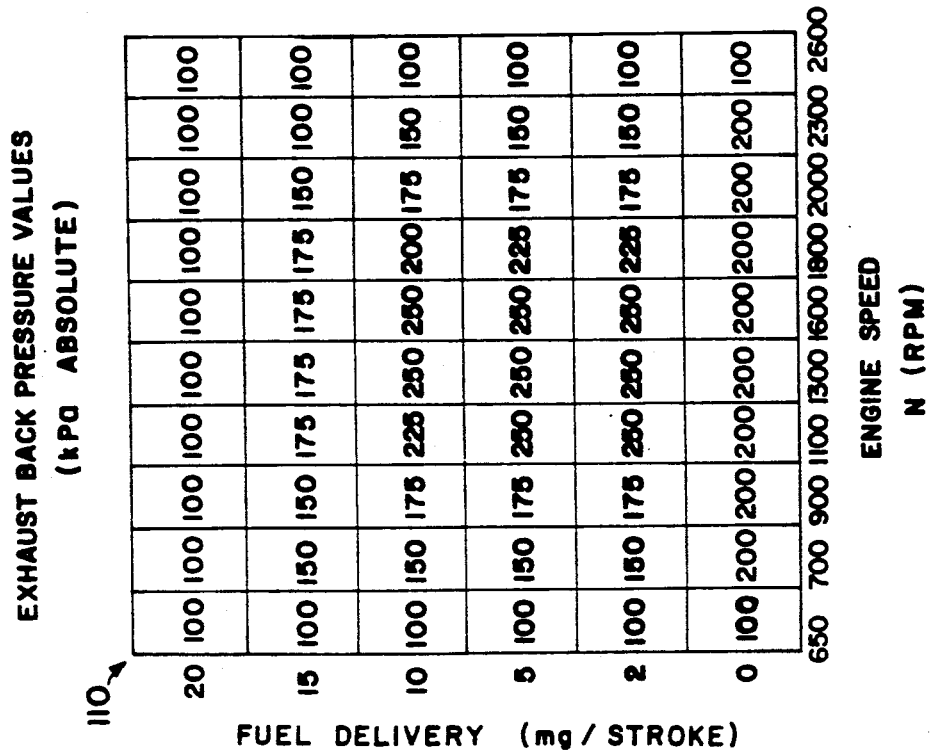
FIG. 5 is a look up table setting forth desired back pressure values relative to fuel delivery rate and engine speed; and, FIG. 6 is a graph showing the value of an exhaust back pressure multiplier relative to sensed engine coolant temperature.

Meanwhile, the engine speed signal from sensor 80 and the fuel delivery output signal 78 are being input into a lookup table 110 containing predetermined values of desired back pressure signals for a given engine speed and fuel rate programmed into the engine microcomputer memory, an example of such a table 110 being shown in FIG. 5, resulting in a desired back pressure signal being output to junction 112.

The desired back pressure signal from the lookup table 110 is multiplied at the junction 112 in the microcomputer 70 by a coolant temperature multiplier signal generated from the graph 114, the multiplier signal having a value between zero and one, inclusive, depending on the engine coolant temperature sensed by sensor 76 which is input to the graph. A zero multiplier results in no back pressure signal being transmitted to the valve 32.

Figure 6:
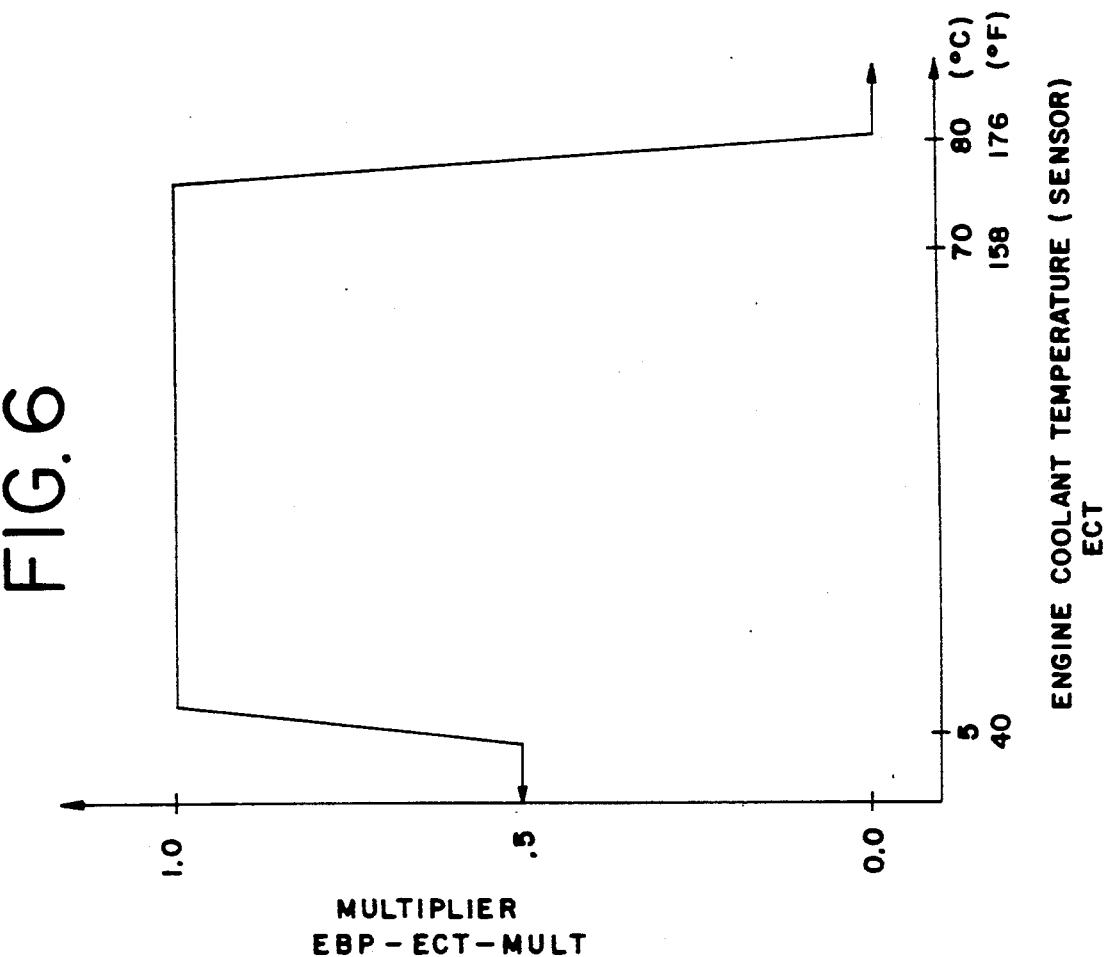

As shown in FIG. 6, the multiplier graph 114 produces a multiplier of 1 during the period when the engine coolant temperature sensor provides a value or reading between 6° C. and 75° C. From this point on, when the engine coolant temperature increases a mere 5°, up to a value of 80° C., there is a very sharp drop in the graph to generate a zero multiplier at temperatures above 80° C., when the engine is within its normal coolant temperature operating range defined by the engine thermostat (not shown), thereby maintaining the system 30 disabled. At the low temperature end, it is considered undesirable to provide the full desired back pressure on the engine when the coolant temperature is very low, i.e., below 4° C., as would occur immediately after starting a cold engine, due to the necessity to first provide sustainable engine operation. At the same time, it is desirable that some operation of the system be provided in this temperature range, in which the lubricating oil is also cold, in order to keep oil pressure in the hydraulic cylinder 38 and thereby ensure quicker response when the coolant temperature rises above 4° C.

Returning now to FIG. 4, the desired back pressure signal passes through the enabling switch 107 controlled from the OR gate 105 to differencing junction 116 whereat a feedback signal of the actual back pressure is input from sensor 72. If the actual back pressure signal does not equal the desired back pressure signal, an error signal is generated to correct the situation by opening or closing the valve 32 appropriately. Naturally, if the desired back pressure is less than the actual back pressure, the valve will become completely open, at which point no further correction is possible. The error signal is sent to multiplier block 118 whereat the error signal is multiplied by a predetermined proportional gain constant, kPBP, to provide stability within the system by providing combined electronic gain and damping, the resultant output providing a final definition of a pulse width modulated output signal, a duty cycle output, to provide a proportional integral control for the back pressure valve 32. The output signal is provided to the solenoid valve 50 to control the back pressure on the engine by influencing the position of the butterfly valve 32 thereof to maintain the exhaust back pressure relative to all the parameters considered. Obviously, if an undesirable back pressure value exists, the valve 32 will be rotated to a specific position to compensate for the error and maintain the desired exhaust back pressure at all times.

As will be understood, it is not desirable to maintain high back pressure at all times, as such increased back pressure will have a negative effect on performance and fuel economy by providing an extra parasitic load on the engine. Therefore, the operating strategy has been designed to obtain a maximum benefit from the back pressure system with minimum degradation of performance and fuel economy and incorporates a variety of features and advantages which are listed below:

System Disabled at Warm Ambient Temperature

The ambient temperature switch will only allow operation of the system 30 under climate conditions when additional cab heat would be required, for example, only at temperatures below 2° C.

System Disabled at High Speeds and Loads

As shown in FIG. 5, the desired back pressure is reduced gradually as speed and load increase to minimize the effect on driveability.

Feedback Control of Back Pressure

The electronic engine microcomputer continuously monitors output from the back pressure sensor through a feedback circuit so that adjustments will be made to the position of the valve 32 of the system 30 until the sensed back pressure equals the desired back pressure.

Feedback Control of Coolant Temperature

The electronic engine microcomputer continuously monitors engine coolant temperature by the provision of a temperature sensor, with the feedback thereof also influencing the back pressure desired within the system, the desired back pressure being gradually reduced as normal coolant operating temperatures within the engine are approached, at which point the coolant temperature results in a zero multiplier which keeps the system from adding extra heat load on the cooling system when the engine is hot. Partial system operation is provided at low coolant temperatures, by the provision of a 0.5 multiplier below 4° C., to maintain oil pressure in the hydraulic cylinder and ensure prompt response when full system operation is required.

System "Exercise" Cycle

At each startup, regardless of ambient temperature, the system will be enabled briefly through the timer 102 to keep the mechanical portions of the system 30 in operating condition during long periods of high ambient temperature when the system is not used.

As described above, the exhaust back pressure control system of the present invention has a number of advantages, some of which have been described above and others of which are inherent in the invention. Also, modifications may be made to the invention without departing from the teachings thereof. Accordingly, the scope of the invention should only be limited as necessitated by the accompanying claims.

We claim:

1. An exhaust back pressure control system for an internal combustion engine having a turbocharger having an engine exhaust port and an engine control microcomputer including:
a valve for selectively restricting said engine exhaust port; and,
means for selectively operating said valve in response to an output signal from said microcomputer, said output signal being calculated as a function of engine coolant temperature, ambient temperature, engine speed, and engine fuel consumption.

2. The system of claim 1 and said output signal also being calculated as a function of elapsed time since start of engine.

3. The system of claim 1 wherein said valve is mounted on the exhaust outlet side of the turbocharger.

4. The system of claim 3 wherein said operating means comprises a hydraulic cylinder having a rod end operatively engaged with said valve to effect opening and closing movement thereof, a head end in communication with an engine lubricating oil pressure source, and a control valve electrically connected to said microcomputer for regulating the pressure in said cylinder in response to said microcomputer output signal.

5. The system of claim 4 and said hydraulic cylinder being integrally incorporated within a pedestal disposed between said turbocharger and said engine.

6. The system of claim 5 wherein oil is supplied to and removed from said cylinder via oil passages integral with those of the turbocharger.

7. The system of claim 1 and an ambient temperature sensor disposed in an air inlet to said engine and switch means responsive to said sensor for sending an enabling signal required to operate said system upon said ambient temperature being below a predetermined value.

8. The system of claim 7 and a timer disposed within said system for sending said enabling signal independently of said ambient temperature switch means during a predetermined short period following the startup of said engine.

9. The system of claim 8 and said short period being thirty seconds.

10. The system of claim 1 wherein a coolant temperature sensor is mounted within the cooling system of the engine, said microcomputer being operatively connected thereto and responsive to proportionally reduce said output signal to said valve in response to coolant temperature excursions beyond a predetermined range.

11. The system of claim 1 wherein a back pressure sensor is mounted within an exhaust manifold of the engine, said microcomputer being operatively connected to said back pressure sensor and being responsive thereto to compare said back pressure to a desired back pressure and produce an error signal as said output signal.

12. The system of claim 11 wherein said error signal is treated with a proportional gain constant generated by said microcomputer for maintaining system stability.

13. The system of claim 1 wherein an engine speed sensor is mounted on the engine and operatively connected to said microcomputer and said microcomputer generates a fuel delivery output signal, said microcomputer being responsive to said engine speed sensor and fuel delivery output signal to generate an output indicative of desired exhaust back pressure from a table of desired exhaust back pressure relative to engine speed and fuel consumption stored in a memory of said microcomputer.

14. An exhaust back pressure control system for an internal combustion engine having an engine exhaust port and an engine control microcomputer including:
a valve for selectively restricting said engine exhaust port;
an engine speed sensor mounted on the engine and operatively connected to said microcomputer and said microcomputer generates a fuel delivery output signal, said microcomputer being responsive to said engine speed sensor and fuel delivery output signal to generate a desired back pressure output signal from a table of desired exhaust back pressure relative to engine speed and fuel consumption stored in a memory of said microcomputer;
a coolant temperature sensor mounted within the cooling system of the engine, said microcomputer being operatively connected thereto and responsive to proportionally reduce said desired back pressure output signal in response to coolant temperature excursions beyond a predetermined range; and,
means for operating said valve in response to said output signal from said microcomputer.

15. The system of claim 14 wherein a back pressure sensor is mounted within an exhaust manifold of the engine, said microcomputer being operatively connected to said back pressure sensor and being responsive thereto to compare said back pressure to said desired back pressure and produce an error signal as said output signal.

16. The system of claim 15 wherein said error signal is treated with a proportional gain constant generated by said microcomputer for maintaining system stability.

17. The system of claim 16 and an ambient temperature sensor and switch means responsive to said sensor for sending an enablement signal to said system permitting said desired back pressure signal to be transmitted to said valve upon said ambient temperature being below a predetermined value.

18. The system of claim 17 and a timer disposed within said system for sending said enablement signal independently of said ambient temperature switch means for a predetermined short period following the startup of said engine.

19. The system of claim 18 wherein said operating means comprises a hydraulic cylinder having a rod end operatively engaged with said valve to effect opening and closing movement thereof, a head end in communication with an engine lubricating oil pressure source, and a control valve electrically connected to said microcomputer for regulating the pressure in said cylinder in response to said microcomputer output signal.

20. The system of claim 19 wherein said engine has a turbocharger, said valve being downstream of said turbocharger.

21. A system for controlling exhaust back pressure under direction of an engine microcomputer, said system including:
a valve within an exhaust port from a turbocharger operable to close off a portion of said exhaust port, thereby increasing exhaust back pressure;

means for operating said valve including a piston within a hydraulic cylinder housing formed as an integral part of said turbocharger, said piston being mechanically engaged to said valve to cause closing thereof;

a lube oil pressure supply line to said cylinder housing from a engine crankcase;

an electrically operated oil flow control valve for regulating the oil pressure within said cylinder; and an electronic engine control microcomputer connected to said control valve, said microcomputer generating a pulse width modulated output signal to operate said control valve according to a duty cycle providing a regulated oil pressure within said cylinder, said pulse width modulated output signal corresponding to a desired exhaust back pressure calculated by said engine microcomputer as a function of engine speed, engine load, and coolant temperature.

22. The system of claim 21 wherein operation of said system is enabled by an ambient temperature switch in electrical engagement with microcomputer, said switch permitting an enable signal at ambient temperatures readings below a predetermined setting.

23. The system of claim 21 wherein the elapsed time from the startup of the engine is monitored by a clock within the engine microcomputer, said microcomputer providing an enable signal to permit system operation when said elapsed time is less than a predetermined value.

24. The system of claim 23 wherein said elapsed time is a relatively short period sufficient to permit movement of said valve while being of sufficiently limited duration to prevent control of the exhaust back pressure from significantly affecting engine operation.

25. The system of claim 21 wherein said engine load is sensed as a value related to fuel delivered to the engine in response to its requirements, said desired back pressure being determined from a lookup table based on engine speed and fuel delivery stored in a memory of said engine microcomputer.

26. The system of claim 25 wherein a reading of current exhaust back pressure is provided to the engine microcomputer by a pressure sensor mounted in an exhaust manifold, said pressure sensor being electrically engaged with said engine microcomputer and providing a feedback circuit for said system.

27. A method for controlling exhaust back pressure in an internal combustion engine under cold ambient conditions, said engine having an electrically controlled valve disposed to restrict the exhaust from said engine and a microcomputer for controlling said valve, said method being performed by said microcomputer and including the steps of:

monitoring the engine speed and the fuel consumption of said engine and generating a desired back pressure signal from a lookup table stored in the memory of said microcomputer;

monitoring the engine coolant temperature and generating a multiplier signal of between and including zero and one dependent on said coolant temperature according to a preselected relationship of said multiplier and said coolant temperature stored within the memory of the microcomputer;

applying said multiplier to the desired back pressure signal derived from said lookup table and, if the multiplier produces a value greater than zero, generating a multiplied desired back pressure signal;

monitoring the ambient air temperature and, upon said temperature being below a preselected ambient temperature, generating an enablement signal permitting transmission of said multiplied desired back pressure signal to said valve;

monitoring the actual back pressure in an exhaust manifold of said engine, comparing the actual back pressure signal to the multiplied desired back pressure signal generated above, and, upon a deviation of said actual back pressure signal from said multiplied desired back pressure signal being detected, sending an output signal to said valve to move said valve to produce an actual back pressure equal to the multiplied desired back pressure.

28. The method of claim 27 further including the step of treating said output signal to said valve with a predetermined proportional gain constant.

29. The method of claim 28 including the step of storing a value for the proportional gain constant in said microcomputer memory.

30. The method of claim 27 further including the step of monitoring the time elapsed since startup of the engine and, during the period that said time is less than a preselected enable period, independently generating said enablement signal permitting transmission of said multiplied desired back pressure signal to said valve.

31. The method of claim 30 wherein said predetermined start up enable period is a relatively short period sufficient to permit movement of said valve while being of sufficiently limited duration to prevent control of the exhaust back pressure from significantly affecting engine operation.

32. The method of claim 30 wherein said predetermined start up enable period is thirty seconds.

33. The method of claim 27 wherein said predetermined ambient air temperature is about 2° C.

34. The method of claim 27 wherein said multiplier is equal to zero when said coolant temperature is in the normal coolant temperature operating range of said engine.

35. The method of claim 34 wherein said multiplier is equal to 0.5 when said coolant temperature is below a predetermined temperature.

36. The method of claim 27 wherein said multiplier is greater than zero when said coolant temperature is below said predetermined ambient temperature.

37. Microcomputer apparatus for controlling exhaust back pressure in an internal combustion engine under cold ambient conditions, said engine having an electrically controlled valve disposed to restrict the exhaust from said engine in response to an output signal from said microcomputer, said apparatus comprising:

a plurality of engine parameter sensors connected respectively to said microcomputer, including sensors for engine speed, coolant temperature, ambient air temperature, and exhaust back pressure;

means within said microcomputer for generating a fuel delivery output signal to said engine;

means within said microcomputer responsive to said engine speed sensor and said fuel delivery output signal for generating a desired back pressure signal from a lookup table stored in the memory of said microcomputer comprising a matrix of desired back pressures determined for various ranges of engine speed and fuel consumption;

means within said microcomputer responsive to said coolant temperature sensor for generating a multiplier signal of between and including zero and one dependent on said coolant temperature according to a preselected relationship of said multiplier and said coolant temperature stored within the memory of the microcomputer, said microcomputer applying said multiplier to the desired back pressure signal derived from said lookup table and, if the multiplier produces a value greater than zero, generating a multiplied desired back pressure signal;

means within said microcomputer responsive to said ambient air temperature sensor and, upon said ambient air temperature being below a preselected ambient air temperature, generating an enablement signal permitting transmission of said multiplied desired back pressure signal to said valve;

means within said microcomputer responsive to said exhaust back pressure sensor for comparing the actual back pressure signal to the multiplied desired back pressure signal generated above, and, upon a deviation of said actual back pressure signal from said multiplied desired back pressure signal being detected, producing said output signal to said valve.

38. The microcomputer apparatus of claim 37 further including means within said microcomputer for treating said output signal to said valve with a predetermined proportional gain constant.

39. The microcomputer apparatus of claim 37 further including means within said microcomputer for monitoring the time elapsed since startup of the engine and, during the period that said time is less than a preselected enable period, independently generating said enablement signal permitting transmission of said multiplied desired back pressure signal to said valve.

40. The microcomputer apparatus of claim 39 wherein said predetermined start up enable period is a relatively short period sufficient to permit movement of said valve while being of sufficiently limited duration to prevent control of the exhaust back pressure from significantly affecting engine operation.

41. A turbocharger mounted system for generating a desired engine exhaust back pressure under computer control, said system including a valve operable to selectively restrict an exhaust outlet of said turbocharger in response to an output signal from said computer, said output being generated by said computer as a calculated function of various engine operating parameters being monitored by said computer, one of said operating parameters being monitored is time since start of engine.

42. A turbocharger mounted system for generating a desired engine exhaust back pressure under computer control, said system including a valve operable to selectively restrict an exhaust outlet of said turbocharger in response to an output signal from said computer, said output being generated by said computer as a calculated function of various engine operating parameters being monitored by said computer, one of said operating parameters being monitored is engine coolant temperature.

43. The system of claim 42 wherein an operating parameter being monitored is ambient air temperature.

44. The system of claim 43 wherein an operating parameter being monitored is engine speed.

45. The system of claim 44 wherein an operating parameter being monitored is engine load.

* * * * *